United States Patent [19]

Usui et al.

[11] 4,023,443
[45] May 17, 1977

[54] TRANSMISSION SYNCHRONIZING MECHANISM

[75] Inventors: Keizaburo Usui; Eiichi Abe, both of Yokohama; Kiyotaka Ozaki, Yokosuka, all of Japan

[73] Assignee: Nissan Motor Co., Ltd., Japan

[22] Filed: Dec. 16, 1975

[21] Appl. No.: 641,353

Related U.S. Application Data

[63] Continuation-in-part of Ser. No. 424,304, Dec. 13, 1973, abandoned.

[30] Foreign Application Priority Data

Dec. 15, 1972 Japan .............................. 47-125218

[52] U.S. Cl. ............................. 74/866; 74/336 R; 192/53 B
[51] Int. Cl.² ....................... B60K 41/18; F16H 5/60
[58] Field of Search ........ 74/329, 339, 335, 336 R, 74/866; 192/53 B, 53 C, 65, 66, 17 R, 18 R

[56] References Cited

UNITED STATES PATENTS

| | | | |
|---|---|---|---|
| 1,328,145 | 1/1920 | Foster | 192/18 R |
| 1,880,666 | 10/1932 | Barnes et al. | 192/18 R X |
| 2,934,186 | 4/1960 | Russell | 74/339 X |
| 2,981,390 | 4/1961 | Doerper | 74/339 X |
| 3,329,638 | 7/1967 | Peras | 74/339 X |
| 3,417,640 | 12/1968 | Schmidt et al. | 74/339 X |
| 3,450,240 | 6/1969 | Lewis et al. | 74/339 X |
| 3,545,307 | 12/1970 | Bildat | 74/339 X |
| 3,581,590 | 6/1971 | Detra et al. | 74/339 |
| 3,625,080 | 12/1971 | Rachel et al. | 74/339 X |
| 3,735,846 | 5/1973 | Hiraiwa | 192/53 C X |

FOREIGN PATENTS OR APPLICATIONS

| | | | |
|---|---|---|---|
| 1,131,831 | 2/1957 | France | 74/339 |
| 1,930,046 | 2/1971 | Germany | 74/339 |

*Primary Examiner*—Samuel Scott
*Assistant Examiner*—Lance W. Chandler
*Attorney, Agent, or Firm*—Robert E. Burns; Emmanuel J. Lobato; Bruce L. Adams

[57] ABSTRACT

An electronic means senses the difference in rotational speed between a main shaft gear to be engaged and the main shaft, and actuates a friction disc assembly to connect the low gear to the main shaft to accelerate the countershaft and thus the gear to be engaged if the gear speed is lower than the main shaft speed, and to connect the first gear to the transmission casing to decelerate the countershaft and thus the gear if the gear speed is higher than the main shaft speed, shifting from neutral into the desired gear ratio is prevented until the gear and main shaft speeds are synchronized.

8 Claims, 5 Drawing Figures

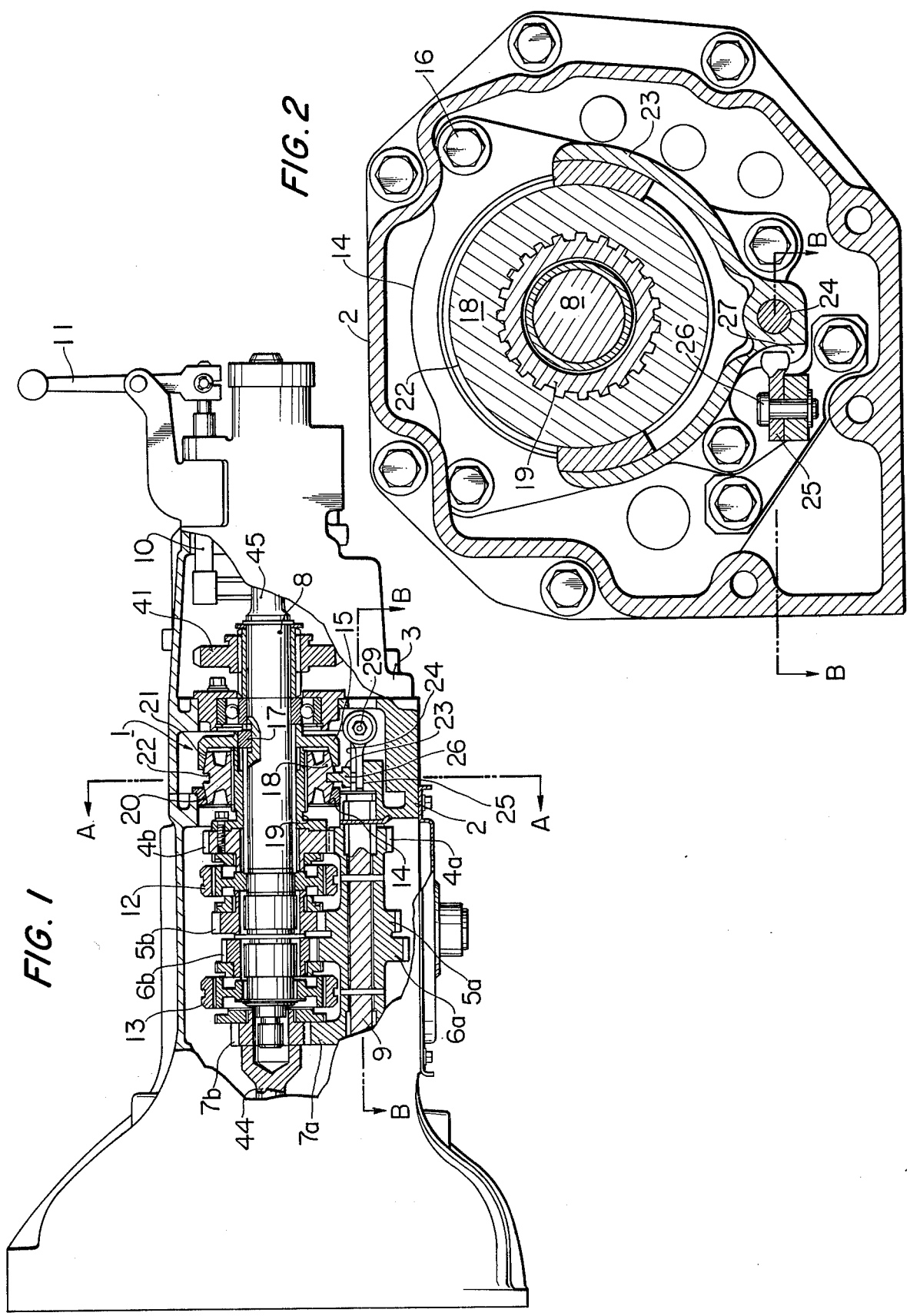

TO OPERATIONAL AMPLIFIRE

TO ENGINE INTAKE MANIFOLD

TO ATMOSPHERE

TO OPERATIONAL AMPLIFIRE

TO BIAS VOLTAGE SUPPLIER

SHIFT LEVER SWITCH

TO TRANSISTER SW.

TRANSMISSION SYNCHRONIZING MECHANISM

This application is a continuation-in-part of our application Ser. No. 424,304 filed Dec. 13, 1973 and now abandoned.

This invention relates to a transmission for an automobile, and more particularly to a synchronizing mechanism for a constant mesh transmission for an automobile to commonly synchronize all gears.

Most manual transmissions used in recent cars are fully synchronized. When the gears in the transmission are shifted, the countershaft and main shaft speeds are synchronized by synchronizing devices provided for the respective gear reduction stages to provide easy shifting of gears in the transmission. As is well known, there are various synchronizing devices, e.g., Warner type, Porche type, ZT type etc.

Conventional synchronizing devices require a relatively large space in the transmission case because they have to be provided at each gear reduction stage. Since the space, in the transmission case allotted for synchronizing devices is very limited, the synchronizing capacity thereof cannot be expected to be greatly increased. There have been heretofore proposed many and various improvements for overcoming such disadvantages of conventional synchronizing devices for transmissions, but the increase of synchronizing capacity is still limited.

It is therefore an object of the present invention to provide an improved synchronizing mechanism for a constant mesh transmission for an automobile which commonly synchronizes all gear reduction stages of the transmission.

It is another object of the present invention to provide an improved synchronizing mechanism for a constant mesh transmission for an automobile which can easily be contained in a limited space in the transmission to enable the synchronizing capacity of the mechanism to be increased greatly.

It is a further object of the present invention to provide an improved synchronizing mechanism for a constant mesh transmission for an automobile which avoids damage and noisy operation of reduction gears in the transmission due to improper gear shifting by a driver.

It is still another object of the present invention to provide an improved synchronizing mechanism for a constant mesh transmission for an automobile which shortens the synchronizing time to avoid an increase in shifting force due to improper disengagement of the clutch by a driver.

It is still another object of the present invention to provide an improved synchronizing mechanism for a constant mesh transmission for an automobile while may be incorporated in a conventional transmission using many conventional parts thereof without modification.

It is still another object of the invention to provide an improved synchronizing mechanism for a constant mesh transmission for an automobile which shortens the axial length of the transmission.

These and other objects, features and advantages of a synchronizing mechanism according to the present invention will become more apparent from the following description taken in conjunction with the accompanying drawings, in which like reference numerals and characters designate corresponding parts and dimensions and in which:

FIG. 1 is a longitudinal sectional side view of a manual constant mesh transmission incorporating an embodiment of a synchronizing mechanism according to the present invention;

FIG. 2 is a sectional view of the transmission of FIG. 1 taken along a section line A-A in FIG. 1;

Figure 3:
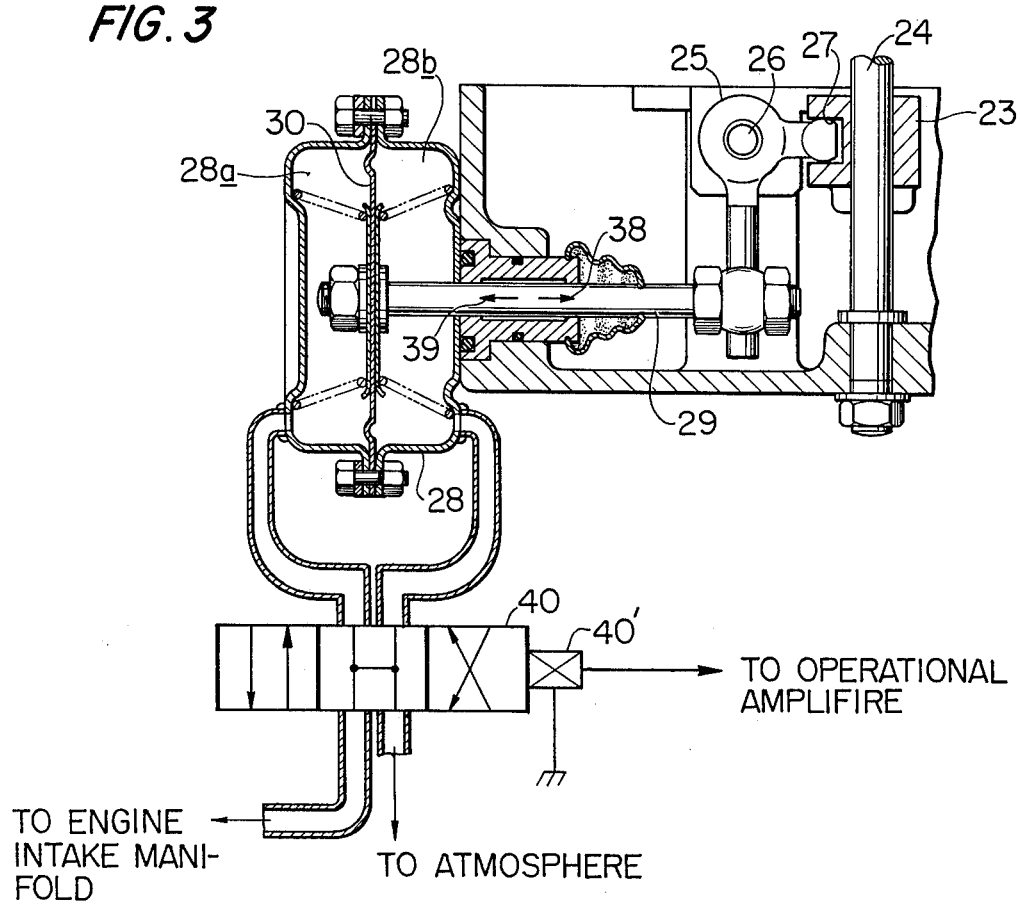
FIG. 3 is a sectional view of the transmission taken along a section line B-B in FIG. 1.

Referring now to FIG. 1, a transmission incorporating a synchronizing mechanism 1 of the invention includes a casing 2 having a rear extension 3. A main shaft 8 integral with an output shaft 45 is rotatably supported within the casing 2 and rear extension 3 in parallel with a countershaft 9. A main drive shaft 44 is axially aligned with the main shaft 8 in a conventional manner. The countershaft 9 has a first pinion 4a, second and third pinions 5a and 6a, and a drive gear 7a fixed thereto which mesh with a first gear 4b, second and third gear 5b and 6b, and a drive pinion 7b respectively. The drive pinion 7b is fixed to the main drive shaft 44 while the gears 4b, 5b and 6b are rotatable about the main shaft 8. The countershaft 9 is thus constantly driven from the main drive shaft 44 through the drive pinion 7b and drive gear 7a, and all pinions and gears are constantly in mesh with their counterparts. A first means comprises first and second selector sleeves 12 and 13 respectively which are splined to the main shaft 8 and are provided with dogs (not shown) formed thereon to connect the gears 4b and 5b and the gear 6b and drive pinion 7b respectively to the main shaft 8 to provide various gear ratios. First, second, third and fourth (direct drive) gear ratios are provided when the gears 4b, 5b, 6b and the pinion 7b are selectively and releasably fixed to the main shaft 8 respectively by the selector sleeves 12 and 13. In the fourth or highest gear ratio, the speed of the main shaft 8 is maximum with respect to the speed of the countershaft 9 and hence the main drive shaft 44. A reverse gear 41 is provided to selectively engage with a reverse idler assembly (not shown) to provide a reverse drive capability. The gears 5b and 6b and the pinion 7b are progressively smaller in diameter than the first gear 4b, and the pinions 5a and 6a and the gear 7a are progressively larger in diameter than the first pinion 4a.

Although not shown as such, it will be assemed for purposes of simplicity of description that the diameters of the drive pinion 7b and the drive gear 7a are equal.

Figure 4:
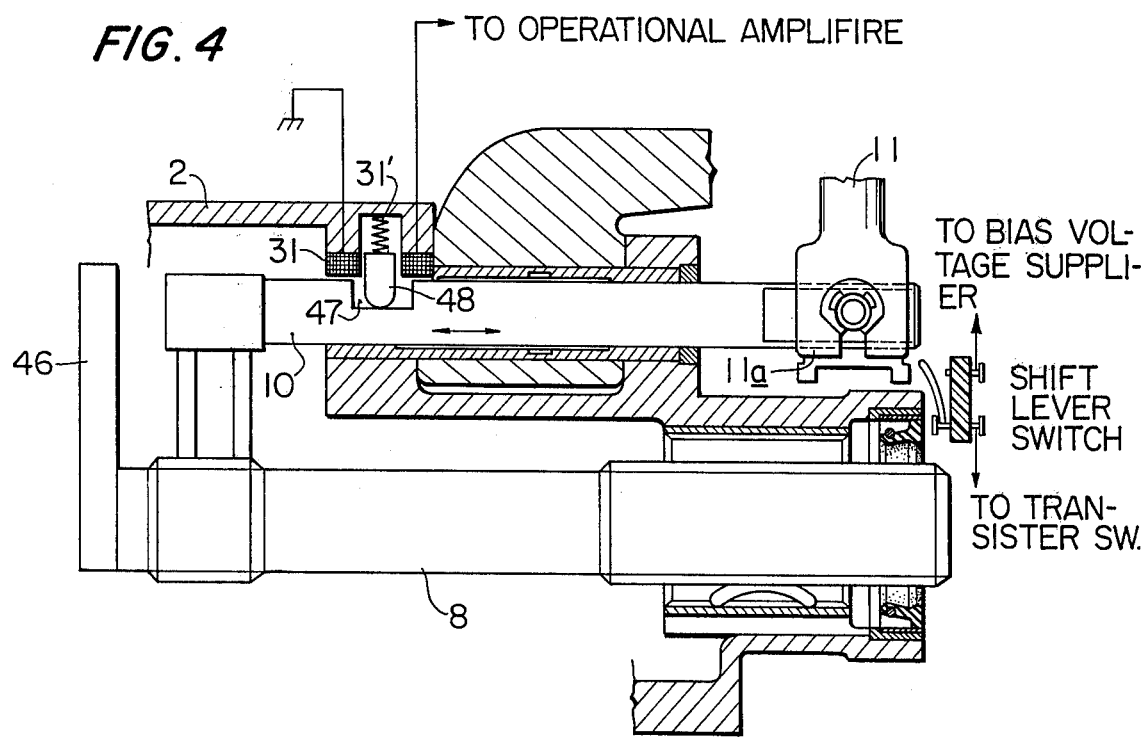
FIG. 4 is a fragmentary view partly in section of a striking rod for a locking device used in a synchronizing mechanism of the present invention.

The first means also includes shift forks 46, one of which is shown in FIG. 4, which axially move the selector sleeves 12 and 13 into engagement with desired gears, and are actuated through a striker rod 10 and a gearshift lever 11 by a vehicle driver. As seen most clearly in FIG. 4, a stopper solenoid 31 is provided to selectively lock the striking rod 10 as will be described below.

The synchronizing mechanism 1 of the invention comprises a first friction member or decelerating cone 14 fixed to the casing 2 by bolts 16 as shown in FIG. 2. A second friction member or accelerating cone 15 is fixed to the main shaft by a key 17. A sliding friction member or slider 18 is rotatable with the first gear 4b and axially slidable into contact with friction surfaces 20 and 21 of the first and second friction members 14 and 15 respectively. The sliding friction member 18 may be splined or similarly mounted on a sleeve 19 fixed to the gear 4b, and has an annular circumferential groove 22. A second means comprises a fork 23, a bell crank level 25 and an actuator 28. As best seen in FIGS. 1, 2 and 3, the fork 23 engages in the groove 22 to axially move the sliding friction member 18 along the main shaft 8. An actuator valve 40 is connected to an engine intake manifold (not shown), and serves to selectively provide communication between the intake manifold and the vacuum operated actuator 28. The actuator 28 has a diaphragm 30 to which one end of an actuating rod 29 is attached, the other end being attached to a mechanical linkage, here shown as the bell crank lever 25.

The bell crank level 25 is rotatable about a pin 26, and has one arm connected to the actuating rod 29 and the end of the other arm engaging in a cutout 27 in the fork 23. The fork 23 is axially slidable along a rod 24, which is parallel to the main shaft 8. The actuator valve 40 is responsive to an electrical signal as will be described below, and is operative to connect the intake manifold to either side of the diaphragm 30. If vacuum is introduced to the left side of the diaphragm 30 as shown in FIG. 3, the actuating rod 29 will move in the direction of an arrow 39, thus rotating the bell crank lever 25 clockwise and moving the fork 23 downward as shown. This will move the sliding friction member 18 into engagement with the second friction member 15 to accelerate the countershaft 9 as will be described below. Conversely, if manifold vacuum is introduced to the right side of the diaphragm 30, the actuating rod 29 will move in the direction of an arrow 38 to move the sliding friction member 18 into engagement with the first friction member 14 to decelerate the countershaft 9.

Figure 5:
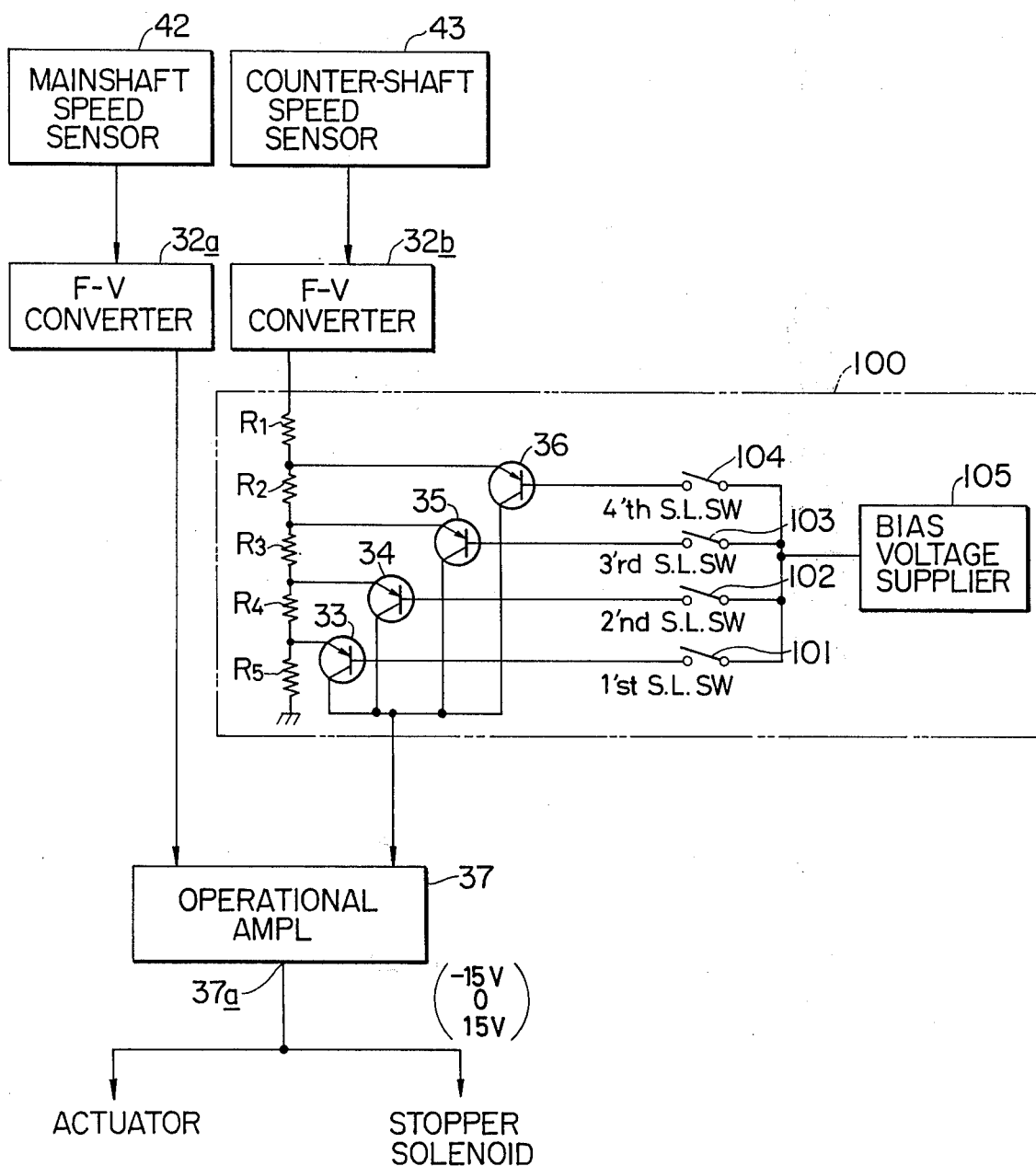
FIG. 5 is a schematic electric diagram of an electronic control circuit for the synchronizing mechanism of the present invention shown in FIG. 1.

Referring to FIG. 5, a main shaft speed sensor 42 and a countershaft speed sensor 43 are provided to sense the rotational speeds of the main shaft 8 and countershaft 9 and produce electrical main shaft speed and countershaft speed signals respectively in pulse form with the frequencies thereof being proportional to the respective rotational speeds. For this purpose, magnetic induction devices such as magnetic pickups may be utilized. A digital-to-analog or frequency-to-voltage (F-V) converters 32a and 32b are provided to convert the main shaft and countershaft speed signals respectively into analog or voltage form. The converted main shaft speed signal is applied directly to an operational amplifier 37, while the converted countershaft speed signal is applied to a computing means which is enclosed by phantom lines generally indicated by numeral 100. The computing means 100 comprises resistors $R_1$ to $R_5$, transistor switches 33 to 36, shift lever switches 101 and 104 and bias voltage supplier 105 which are connected to each other as well shown in this drawing. As seen in the right side of FIG. 4, each of the shift lever switches 101 to 104 is arranged adjacent the lower end 11a of the gear shift lever 11 in such a manner that when the shift lever 11 is slightly moved by the vehicle driver toward a direction which is corresponding to the desired gear position, the corresponding shift lever switch is closed. Thus, in this instance, an electrical connection between the F-V converter 32b and the operational amplifier 37 through the corresponding resistors is accomplished because of the closing condition of the corresponding transistor switch. For example, when the third shift lever switch 103 is closed, the electrical connection is made through the two resistors $R_1$ and $R_2$. The operational amplifier 37 is so arranged to generate at the output thereof 37a a first voltage signal of +15 V, a second voltage signal of O V and a third voltage signal of −15 V if the magnitude of the converted main shaft speed signal directly applied from the F-V converter 32a is larger than, equal to, or less than the magnitude of the voltage signal applied to the operational amplifier 37 through the computing means 100, respectively. The actuator valve 40 has three states thereof, as well shown in the lower side of FIG. 3, one of which is a first state to provide communication between the chamber 28a and the engine intake manifold (not shown), the other of which is a second state to provide communication between the chamber 28a and the chamber 28b while providing communication to the atmosphere, the other one of which is a third state to provide communication between the chamber 28b and the engine intake manifold. In this figure, the actuator valve 40 is so illustrated to take the second state thereof. In operation of the actuator valve 40, when the operation amplifier 37 generates the first voltage signal of +15 V, the voltage (+15 V) is applied to the solenoid coil 40′ for setting the actuator valve 40 at the first state thereof thereby causing the diaphragm 30 to be moved leftwardly, so that the actuating rod 29 slides leftwardly to shift the sliding friction member 18 into engagement with the second friction member 15 to accelerate the rotation of the counter shaft 9. When the operational amplifier 37 generates the second voltage signal of O V, the actuator valve 40 takes the second state thereof thereby causing the diaphragm 30 to be positioned at the neutral position (the stage shown in FIG. 3). Thus, the sliding friction member 18 is maintained to locate at the neutral position thereof without engaging with both of the first and second friction members 14 and 15. On the contrary, if the negative voltage (−15 V) due to the generation of the third voltage signal of −15 V is applied from the operational amplifier 37 into the solenoid valve 40′, the chamber 28b is vacuumed thereby causing the actuating rod 29 to be moved rightwardly, so that the sliding friction member 18 is brakingly engaged with the first friction member 14 to decelerate the rotation of the counter shaft 9.

The purpose of a synchronizing mechanism is to cause the main shaft and the gear which is to be fixed thereto by a selector sleeve to rotate at the same speed prior to final engagement, to prevent unpleasant grinding and crunching noises, breakage of dogs, etc. It will be noted that the countershaft speed is maximum with respect to the main shaft speed when the transmission is operating in its first gear ratio, or when the first gear 4b is fixed to the main shaft 8. Another important point of the invention is that the speed of any of the gears 4b, 5b and 6c can be computed by multiplying the countershaft speed by the gear ratio between the pinions 4a, 5a and 6a corresponding gears 4b, 4c and 4d. Since the countershaft speed (or the speed of a pinion fixed thereto) is always greater than that of the corresponding main shaft gear with which it meshes, this gear ratio multiplier will always have a numerical value less than unity. This invention utilizes this fact in the design of the computing means 100 shown in FIG. 5. The values of the resistors are chosen so that the numerical value of $$\frac{R_5}{R_1 + R_2 + R_3 + R_4 + R_5}$$

is equal to numerical value of the gear ratio between the first pinion 4a and the first gear 4b. Thus, the output voltage of the computing means 100 to be applied to the operational amplifier 37 is analogous to the speed of the gear 4b. Similarly, output voltages analogous to the speeds of the gears 5b, 6b and the pinion 7b can be provided by closing the corresponding shift lever switches 101 to 104 of the computing means 100, as is obvious to a person skilled in the art.

Thus, if the speed of a gear to be engaged is higher than that of the main shaft 8, the magnitude of the voltage signal generated by the computing means 100 will be higher than that of the converted main shaft speed signal, and the operational amplifier 37 will generate the third voltge signal of $-15$ V to be fed to the actuator valve 40. In this case, the sliding friction member 18 will be moved into engagement with the first friction member 14. The countershaft 9 will then be brakingly connected to the casing 2 through the first pinion 4a, first gear 4b, sleeve 19, sliding friction member 18 and first friction member 14. It will be noted that the connection is frictional between the sliding friction member 18 and the first friction member 14, so that the countershaft 9 will be braked or decelerated.

As soon as the speed of the gear to be engaged drops to that of the main shaft 8, the magnitudes of the voltage signal applied to the operational amplifier 37 through the computing means 100 and the converted main shaft speed signal become equal, and the operational amplifier 37 produces the second voltage signal of O V at the output thereof. At this point, the sliding friction member 18 is disengaged from the first friction member 14 as described hereinbefore, and the driver is able to easily engage the desired gear. If the gear to be engaged is rotated slower than the main shaft 8, the operation of the synchronizing device 1 is generally the reverse of the operation just described. In this case, the countershaft 9 is acceleratedly connected to the main shaft 8 through first pinion 4a, first gear 4b, sleever 19, sliding friction member 18 and second friction member 15, and will be accelerated. An important point is that the speed of the countershaft 9 with respect to that of the main shaft 8 is maximum in the first gear ratio, and the operation last described is equivalent to operating the transmission in its first gear condition, except that frictional connection between the first gear 4b and the main shaft 8 is made through the sliding friction member 18 and the second friction member 15 rather than solid connection therebetween by means of the selector sleeve 12. Thus, if the sleeve 19 is attached to the first gear 4b rather than another gear, the synchronizing device 1 will allow the countershaft 9 to be accelerated if necessary no matter what gear is selected to be engaged.

The computing means and the stopper solenoid 31 will now be described in greater detail, referring to FIGS. 4 and 5. In FIG. 4, the stopper solenoid 31 is shown as having a plunger 48 adapted to protrude into a hole 47 bored in the striking rod 10. The diameter of the hole 47 is greater than that of the plunger 48, so that the striking rod 10 can be moved slightly even if the plunger 48 is protruding into the hole 47. The stopper solenoid 31 further has a tension spring 31' having both ends respectively connected to the upper end portion of the plunger 48 and the inner wall portion of the casing as shown in this drawing. It is now to be noted that the plunger 48 is urged by the tension spring 31' in a direction to desengage from the hole 47 and the plunger 48 is maintained to desengage from the hole 47 when the second voltage signal of O V from operational amplifier 37 is applied to the stopper solenoid 31. But, when the stopper solenoid 31 is energized by either of the first and third voltage signals (+15 V and $-$ 15 V) from the operational amplifier 37, the plunger 48 is caused to be pull down into the hole thereby locking the striking rod 10. Thus, when the sliding friction member 18 is engaged with either the first or second friction member 14 or 15, the plunger 48 is extended into the hole 47. The hole 47 is located at a position corresponding to the neutral gear ratio position of the striking rod 10.

When the gearshift lever 11 is moved through the neutral gear position during a gear ratio changeover operation, it is stopped by engagement of the plunger 48 in the hole 47 if the speed of the gear to be engaged is not equal to that of the main shaft 8. However, the lever 11 and striking rod 10 can be moved slightly from the neutral position in the direction to engage the desired gear because the diameter of the hole 47 is greater than that of the plunger 48. As described hereinbefore, the switch assembly comprises four shift lever switches 101–104 corresponding to the first to fourth gear positions connected to the bases of the transistor switches 33 to 36 as shown. The other ends of the shaft lever switches 101–104 are connected to the bias voltage supplier 105, so that when a shift lever switch is closed, the corresponding transistor switch is turned ON, and the corresponding point of the voltage divider is connected to the input of the operational amplifier 37. As mentioned hereinbefore the shift lever switches 101–104 are arranged so that when the gearshift lever 11 and thus the striking rod 10 are moved slightly from their neutral positions toward a gear engagement position, the corresponding switch is closed to inform the computing means 100 which gear ratio the driver wishes to select and what ratio by which to multiply the countershaft speed. As soon as the speed of the desired gear is synchronized to that of the main shaft 8, the plunger 48 of the stopper solenoid 31 is retracted and the driver is able to engage his desired gear without trauma.

Illustrative examples of the operation of the computing means will now be given.

1. Upshifting from first to second gear

In the first gear ratio, the first gear 4b is fixed to the main shaft 8, and the magnitude of the voltage signal appeared on the output of the computing means 100 is:

$$\frac{R_5}{R_1 + R_2 + R_3 + R_4 + R_5} V_{c1}$$

where $V_{c1}$ is the voltage of the countershaft speed signal in first gear of a given vehicle speed, because the first shift lever switch 101 is closed to make the transistor switch 33 to be ON.

Since the ratio between the pinion 7b and gear 7a was chosen to be unity for sake of simplicity, the speed of the main drive shaft 44 is equal to that of the countershaft 9. It will be understood that a ratio other than unity could easily be handled by introduction of a constant multiplier.

If the first gear 4b is disconnected from the main shaft 8 and the second gear 5b is connected to the main shaft 8, the transistor switch 34 will be turned ON by the corresponding shift lever switch 102 to provide on the output of the computing means 100 a voltage signal of $$\frac{R_4 + R_5}{R_1 + R_2 + R_3 + R_4 + R_5} V_{c1}$$

which is higher than the previous voltage.

Before the shifting operation was begun, the voltage signal on the output of the computing means 100 had the same magnitude as the converted main shaft speed signal because the factor $$\frac{R_5}{R_1 + R_2 + R_3 + R_4 + R_5}$$

is equal to the ratio between the first pinion 4a and the first gear 4b. Thus, the output of the operational amplifier 37 was 0V. However, in the second gear case, the voltage signal is higher than that of the converted main shaft signal magnitude of which is:

$$\frac{R_5}{R_1 + R_2 + R_3 + R_4 + R_5} V_{c1}$$

and then the operational amplifier 37 output will be −15 V to decelerate the countershaft 9 and thus the gear 5b. When the speeds are equalized, the shifting operation may be completed.

2. Downshafting from third gear to second gear

In third gear, the voltage signal appeared on the output of the computing means 100 is $$\frac{R_3 + R_4 + R_5}{R_1 + R_2 + R_3 + R_4 + R_5} V_{c3}$$

at a given vehicle speed, since the transistor switch 35 is turned ON by close of the third shifting lever switch 103. However, to shift down into second gear, the gear 6b is disconnected from the main shaft 8 and the transistor 34 is turned ON, thus generating a new voltage signal of $$\frac{R_4 + R_5}{R_1 + R_2 + R_3 + R_4 + R_5} V_{c3}$$

The initial voltage signal on the output of the computing means 100 was equal to the converted main shaft speed signal to produce a 0V operational amplifier 37 output, but the new voltage signal is lower than the converted main shaft speed signal voltage the magnitude of which is $$\frac{R_3 + R_4 + R_5}{R_1 + R_2 + R_3 + R_4 + R_5}$$

The operational amplifier 37 thus generates a +15 V output to accelerate the countershaft 9 and thus the gear 5b until the speed of the gear 5b is equal to that of the main shaft 8. The striking rod 10 is then released and the driver may complete the shifting operation.

What is claimed is:

1. In a power transmission having a casing rotatably supporting therewithin a main shaft and a countershaft in a parallel relationship, first and second pinions fixedly mounted on said countershaft spaced axially to each other, first and second gears rotatable about said main shaft and meshing with said first and second pinions respectively, a sleeve member axially slidably splined to said main shaft and slidable between said first and second gears, said sleeve member being operative to selectively and releasably fix one of said first and second gears to said main shaft, sleeve actuating means operative for axially moving said sleeve member along said main shaft when a shift lever is manually operated, first means operable for varying the rotation speed of said countershaft, and second means responsive to the rotation speeds of said countershaft and said main shaft to control the operation of said first means, the improvement in that said first means comprises:

a first friction member firmly fixed to said casing adjacent to said main shaft:

a second friction member firmly mounted on said main shaft adjacent to said first friction member; and a sliding friction member rotatable with said first gear about said main shaft and axially slidable along said main shaft between said first and second friction members, said sliding friction member having at axial opposite ends thereof a pair of outer walls selectively and releasably engageable with one of said first and second friction members to effect a deceleration amnd an acceleration respectively of said countershaft;

said second means is operative to selectively move said sliding friction member into slidable engagement with one of said first and second friction members when the rotational speed of one of said first and second gears is higher and lower respectively than the rotational speed of said main shaft.

2. The improvement as claimed in claim 1, in which said first friction member has a first conical inner wall concentric with said main shaft; said second friction member has a second conical inner wall concentric with said main shaft; and said sliding friction member has at the axial ends thereof a pair of outer conical walls which are selectively and releasably engageable with one of said first and second inner walls.

3. The improvement as claimed in claim 1, in which said second means comprises:

a main shaft speed sensor generating a main shaft speed signal;

a counter shaft speed sensor generating a countershaft speed signal;

a converter for converting the main shaft speed signal and the countershat speed signal respectively into voltage form;

computing means for dropping the voltage of said countershaft speed signal into a desired level in accordance with the selective positions of said shift lever;

an operational amplifier for comparing the voltage of said main shaft speed signal with the dropped voltage appeared on the output of said computing means so as to generate at the output thereof a positive first voltage signal, a second voltage signal of 0 V and a negative third voltage signal when the magnitude of said voltage of said main shaft speed signal is larger than, equal to, or less than the magnitude of the voltage signal appeared on the output of said computing means, respectively; and an actuator means for moving said sliding friction member into slidable engagement with said first friction member and said second friction member when said third voltage signal and said first voltage signal from said operational amplifier are applied thereto, respectively.

4. The improvement as claimed in claim 1, further comprising a stopper solenoid means which is operable to lock a striking rod of said sleeve actuating means when energized by either of said first and third voltage signals.

5. The improvement as claimed in claim 4, in which said first and third voltage signals are the voltages of +15 V and −15 V, respectively.

6. The improvement as claimed in claim 4, in which said stopper solenoid means comprises a solenoid coil fastened to a portion of said casing adjacent to said striking rod, a plunger member slidably disposed in said solenoid coil and adapted to protrude into a hole bored in said striking rod when said solenoid coil is deenergized.

7. The improvement as claimed in claim 6, in which said stopper solenoid means further comprises a tension spring which has both ends respectively connected to the upper portion of said plunger member and the inner wall portion of said casing so as to bias said plunger member in a direction to protrude into said hole in said striking rod.

8. The improvement as claimed in claim 3, in which said actuator means comprises:

a vacuum actuator having therein a diaphragm to define the chamber in said vacuum actuator into first and second chambers;

valve means having a solenoid coil and being operable for simultaneously providing communication between said first chamber and the engine intake manifold, and communication between said second chamber and the atmosphere when said third voltage signal is applied to said solenoid coil, and being operable for simultaneously providing communication between said first chamber and the atmosphere, and communication between said second chamber and said engine intake manifold when said first voltage signal is applied to said solenoid coil; and rod member providing connection between said diaphragm in said vacuum actuator and said sliding friction member.

* * * * *